United States Patent
Frye et al.

(10) Patent No.: US 9,634,469 B2
(45) Date of Patent: Apr. 25, 2017

(54) COMPLEX ELECTRICALLY OPERATED GROUND AND TEST DEVICE USING VACUUM CIRCUIT INTERRUPTERS AND METHODS OF OPERATING THE SAME

(71) Applicant: Eaton Corporation, Cleveland, OH (US)

(72) Inventors: Richard Blaine Frye, Aliquippa, PA (US); Brad Robert Leccia, Bethel Park, PA (US); David Len Walls, Wexford, PA (US); Zachary Ryan Jenkins, Pittsburgh, PA (US)

(73) Assignee: EATON CORPORATION, Cleveland, OH (US)

( * ) Notice: Subject to any disclaimer, the term of this patent is extended or adjusted under 35 U.S.C. 154(b) by 148 days.

(21) Appl. No.: 14/620,791

(22) Filed: Feb. 12, 2015

(65) Prior Publication Data
US 2016/0241003 A1    Aug. 18, 2016

(51) Int. Cl.
*H01H 13/00*    (2006.01)
*H02B 13/00*    (2006.01)
*H01H 33/66*    (2006.01)
*H02B 11/28*    (2006.01)

(52) U.S. Cl.
CPC ............ *H02B 13/00* (2013.01); *H01H 33/66* (2013.01); *H02B 11/28* (2013.01)

(58) Field of Classification Search
CPC ... H01H 2009/0061; H01H 2033/6623; H01H 2033/6665; H01H 31/003; H01H 33/66207; H01H 33/6661; H01H 9/0027; H01H 9/0033; H01H 9/0038; H01H 2009/546; H01H 2201/004; H01H 33/122; H01H 33/16
See application file for complete search history.

(56) References Cited

U.S. PATENT DOCUMENTS

| | | |
|---|---|---|
| 1,904,565 A | 4/1933 | Swanson |
| 2,600,304 A | 6/1952 | Krida |
| 2,735,042 A | 2/1956 | Hayford et al. |
| 3,130,352 A | 4/1964 | Guinan |

(Continued)

OTHER PUBLICATIONS

Siemens; TechTopics No. 87, Ground and test devices; www.usa.siemens.com/techtopics; 7 pages. (2012).

(Continued)

*Primary Examiner* — Truc Nguyen
(74) *Attorney, Agent, or Firm* — Myers Bigel, P.A.

(57) ABSTRACT

A grounding and test device includes a chassis configured to be removably installed in a drawout switchgear compartment (e.g., a breaker compartment) having a load conductor and a line conductor therein. The device also includes an interconnection bus supported by the chassis and a ground conductor supported by the chassis. The device further includes a first vacuum circuit interrupter supported by the chassis and configured to selectively couple and decouple the interconnection bus and the line conductor, a second vacuum circuit interrupter supported by the chassis and configured to selectively couple and decouple the interconnection bus and the load conductor and a third vacuum circuit interrupter supported by the chassis and configured to selectively couple and decouple the interconnection bus and the ground conductor.

20 Claims, 6 Drawing Sheets

(56) References Cited

U.S. PATENT DOCUMENTS

| | | | |
|---|---|---|---|
| 4,202,028 A | 5/1980 | Baird | |
| 4,336,520 A * | 6/1982 | Trayer | H01H 33/666 337/191 |
| 6,373,015 B1 * | 4/2002 | Marchand | H02B 13/0354 218/139 |
| 2004/0104201 A1 * | 6/2004 | Sato | H02B 13/0354 218/118 |
| 2006/0037944 A1 * | 2/2006 | Morita | H02B 13/0354 218/140 |
| 2013/0048478 A1 * | 2/2013 | Lammers | H01H 1/40 200/50.27 |
| 2015/0124376 A1 * | 5/2015 | Morita | H02B 1/22 361/611 |
| 2015/0262767 A1 * | 9/2015 | Benke | H01H 9/24 200/50.27 |

OTHER PUBLICATIONS

Eaton; Type VCP-W Electrical Ground and Test Device (Complex); Cutler-Hammer, Effective Nov. 1997 (ISI) Style 3778A20B; Effective Nov. 1997 Supersedes I.L. 3778A20A dated Mar. 1993, 12 pages.

ABB, 5/15 kV, 63 kA Manual Ground & Test Device; Installation, Operations and Maintenance Manual; ABB 1VAL064601-MB Rev A, Jan. 2014, 13 pages.

IEEE Standard for 4.76 kV to 38kV Rated Ground and Test Devices Used in Enclosures; IEEE Power and Energy Society; IEEE Std C37.20.6™-2015 (Revision of IEEE Std c37.20.6-2007), 34 pages.

International Search Report and Written Opinion Corresponding to International Application No. PCT/US2016/016724; Date of Mailing: Jun. 9, 2016; 12 Pages.

* cited by examiner

COMPLEX ELECTRICALLY OPERATED GROUND AND TEST DEVICE USING VACUUM CIRCUIT INTERRUPTERS AND METHODS OF OPERATING THE SAME

BACKGROUND

The inventive subject matter relates to power distribution apparatus and methods of operating the same and, more particularly, to power distribution test apparatus and methods.

Ground and test devices are commonly used to create an electrically safe environment when working on enclosed medium voltage electrical switchgear. These devices typically have a chassis designed to be installed in a draw-out switchgear compartment and include contacts configured to engage phase and/or load conductor buses in the switchgear compartment when the device is installed. The ground and test device may be configured to ground the line and/or load conductors, and may include test ports or other features to facilitate testing.

A standard for ground and test devices is IEEE C37.20.6 "IEEE Standard for 4.76 kV to 38 kV Rated Ground and Test Devices Used in Enclosures." The standard identifies four types of ground and test devices: (1) simple manual; (2) complex manual; (3) simple electrical; and (4) complex electrical. A simple manual device has upper and/or lower terminals with provision for connecting phase conductors to ground. A complex device has upper and/or lower terminals and has a manually operated switch configured to connect the upper or lower terminals to a set of test terminals which, in turn, may be connected to ground. A simple electrical device has a set of upper terminals or a set of lower terminals and an electrically operated switch that is configured to connect the upper or lower terminals to ground even if the system is energized. A complex electrical system has a manually operated switch that is configured to connect upper and/or lower terminals to a power-operated grounding switch, and may be used to apply a ground even if the system is energized.

SUMMARY

Some embodiments of the inventive subject matter provide a grounding and test device including a chassis configured to be removably installed in a drawout switchgear compartment (e.g., a breaker compartment) having a load conductor and a line conductor therein. The device also includes an interconnection bus supported by the chassis and a ground conductor supported by the chassis. The device further includes a first vacuum circuit interrupter supported by the chassis and configured to selectively couple and decouple the interconnection bus and the line conductor, a second vacuum circuit interrupter supported by the chassis and configured to selectively couple and decouple the interconnection bus and the load conductor and a third vacuum circuit interrupter supported by the chassis and configured to selectively couple and decouple the interconnection bus and the ground conductor.

The first vacuum circuit interrupter may include a plurality of first vacuum circuit interrupters, respective ones of which are configured to selectively couple and decouple the interconnection bus and respective ones of a plurality of line conductors. The second vacuum circuit interrupter may include a plurality of second vacuum circuit interrupters, respective ones of which are configured to selectively couple and decouple the interconnection bus and respective ones of a plurality of load conductors.

In some embodiments, the chassis includes a housing having a vertical rear face configured to face into the switchgear compartment when the chassis is installed. The first vacuum circuit interrupter may be included in a first elongate pole unit mounted on and extending from the vertical rear face of the housing, and the second vacuum circuit interrupter may be included in a second elongate pole unit mounted on and extending from the vertical rear face of the housing. A first end of the first pole unit may be mounted at the vertical rear face of the housing and the first pole unit may include a contact disposed at a second end of the first pole unit and configured to engage the line conductor when the chassis is installed in the breaker compartment. A first end of the second pole unit may be mounted at the vertical rear face of the housing and the second pole unit may include a contact disposed at a second end of the second pole unit and configured to engage the load conductor when the chassis is installed in the breaker compartment.

The interconnection bus may include an elongate bus bar extending horizontally between the first and second pole units and mounted on the vertical rear face of the housing. The device may include at least one insulating standoff mounted on the vertical rear face of the housing and supporting the bus bar.

The third vacuum circuit interrupter may be included in a third elongate pole unit mounted on the chassis beneath the first and second pole units and the bus bar and extending longitudinally in a direction orthogonal to longitudinal axes of the first and second pole units. The bus bar may include a first bus bar and the device may further include a second elongate bus bar connected to the first bus bar and extending perpendicularly therefrom to contact a terminal of the third pole unit.

The device may further include a controller supported by the chassis and configured to control the first and second pole units. The device may also include a first control switch coupled to the controller and configured to control the first vacuum circuit interrupter pole unit and a second control switch coupled to the controller and configured to control the second vacuum circuit interrupter pole unit. The controller and the first and second switches may be mounted in a panel removably attached at the front face of the housing.

According to further embodiments of the inventive subject matter, a grounding and test device includes a chassis configured to be removably installed in a drawout switchgear compartment having a plurality of load conductors and a plurality of line conductors therein. The chassis includes a housing having a vertical front face configured to face outward from the circuit breaker housing when the chassis is installed therein and a vertical rear face on an opposite side of the housing from the first vertical face and configured to face inside the switchgear compartment. The device also includes a horizontal row of spaced apart first vacuum circuit interrupter pole units mounted on the vertical rear face of the housing and extending perpendicularly therefrom. The first vacuum circuit interrupter pole units have respective contacts configured to engage respective ones of the plurality of line conductors. A horizontal row of spaced apart second vacuum circuit interrupter pole units is mounted on the vertical rear face of the housing and extend perpendicularly therefrom parallel to the row of first vacuum circuit interrupter pole units. The second vacuum circuit interrupter pole units have respective contacts configured to engage respective ones of the plurality of load conductors. The device further includes an elongate interconnection bus bar mounted on the vertical rear face of the housing and extending horizontally between the rows of first and second vacuum circuit interrupter pole units. Respective flexible conductors extend perpendicularly from the interconnection bus bar and connect respective ones of the first and second vacuum circuit interrupter pole units to the interconnection bus bar. A ground conductor is supported by the chassis and a third vacuum circuit interrupter pole unit is supported by the chassis and coupled between the interconnection bus bar and the ground conductor.

Further embodiments provide methods including installing a grounding and test device in a drawout switchgear compartment having a load conductor and a line conductor therein. The grounding and test device includes a first vacuum circuit interrupter configured to coupled between an interconnection bus and the line conductor, a second vacuum circuit interrupter configured to be coupled between the interconnection bus and the load conductor, and a third vacuum circuit interrupter configured to be coupled between the interconnection bus and a ground conductor. The methods include closing the first third vacuum circuit interrupter and the third vacuum circuit interrupter while maintaining the second vacuum circuit interrupter in an open state to ground the line conductor and closing the second vacuum circuit interrupter and the third vacuum circuit interrupter while maintaining the first vacuum circuit interrupter in an open state to ground the load conductor. The methods further include closing the first and second vacuum circuit interrupters while maintaining the third vacuum circuit interrupter in an open state.

DETAILED DESCRIPTION

Figure 1:
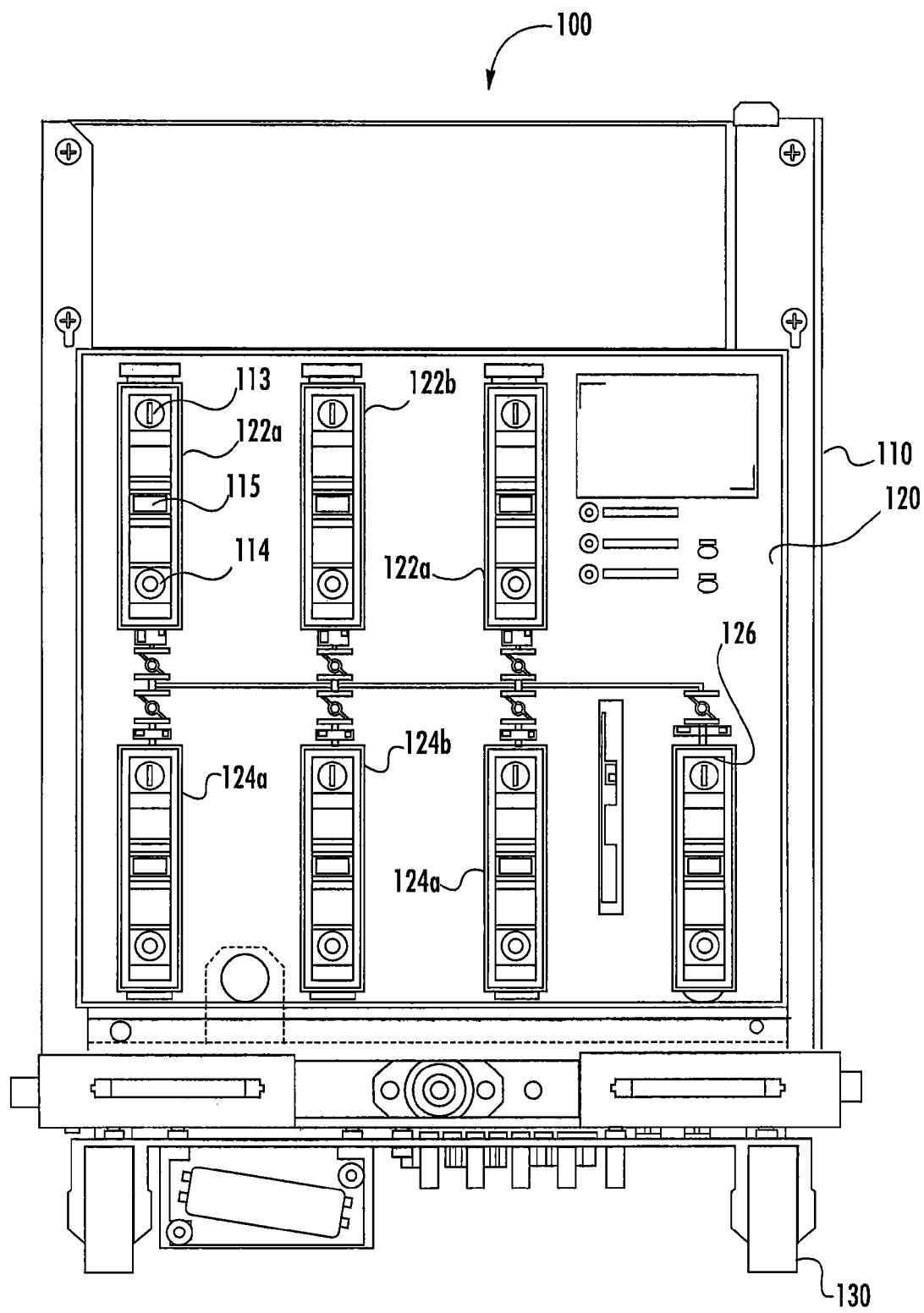
FIG. 1 is a front elevation of a grounding and test device according to some embodiments.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

FIGS. 1-4 illustrate a complex electrically-operated test and grounding device 100 according to some embodiments of the inventive subject matter. The test and grounding device 100 includes a chassis 110, which is configured to be removably installed in a draw-out switchgear compartment, such as a compartment configured to receive a medium-voltage circuit breaker. The chassis 110 may include features, such as rollers 130, configured to facilitate insertion and removal of the chassis from the switchgear compartment. The chassis 110 further includes a control housing 170 having a vertically-oriented front face 172 and a vertically-oriented rear face 174. A front panel 120 is mounted at the front face 172, and includes control circuitry described in detail below.

Vacuum circuit interrupter pole units 142a, 144a, 142b, 144b, 142c, 144c are mounted on the rear face 174 of the control housing 170. The vacuum circuit interrupter pole units 142a, 144a, 142b, 144b, 142c, 144c extend longitudinally from the rear face 174 of the control housing 1790 and are arranged such that primary disconnects (stabs) 330 thereof are configured to engage upper and lower buses 10, 20 within the switchgear compartment when the grounding and test device 100 is installed. It will be appreciated that the upper and lower buses 10, 20 may be line and load buses, respectively, but it will be further appreciated that other arrangements of vacuum circuit interrupter devices may be used. The contact arrangement illustrated is also provided for purposes of illustration, and other stab arrangements, such as stabs configured to engage vertical conductors or rounded conductors may be used.

Figure 2:
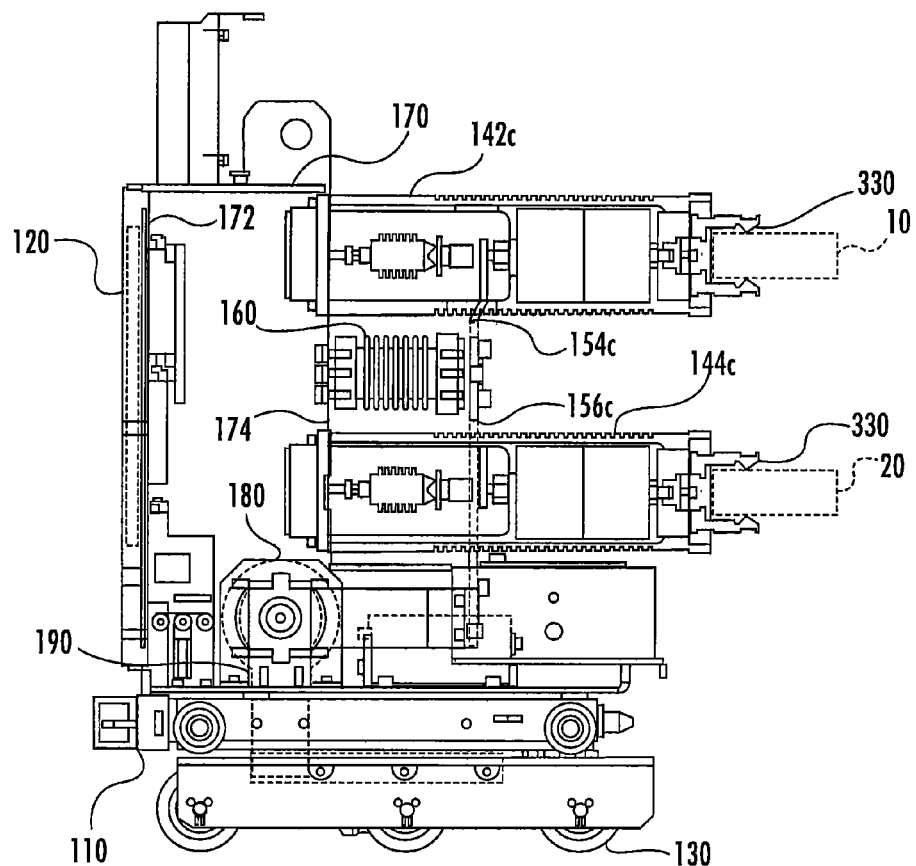
FIG. 2 is a side elevation of the grounding and test device of FIG. 1.
Figure 4:
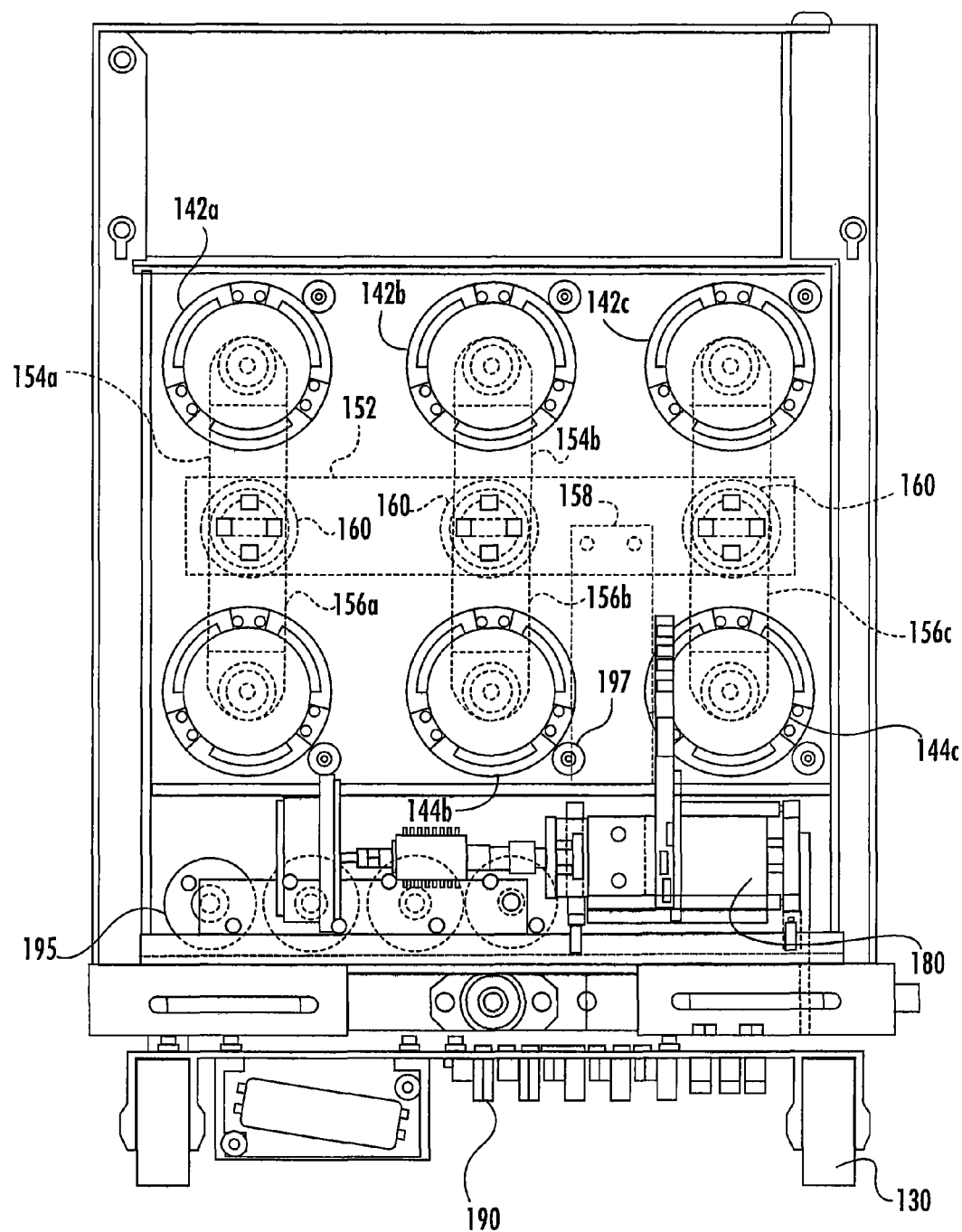
FIG. 4 is front elevation of the grounding and test device of FIGS. 1 and 2 with a front cover removed.

Referring to FIGS. 2 and 4, the vacuum circuit interrupter pole units 142a, 144a, 142b, 144b, 142c, 144c are arranged in upper and lower horizontal rows. An interconnection bus bar 152 extends horizontally between the rows of vacuum circuit interrupter pole units 142a, 144a, 142b, 144b, 142c, 144c and is coupled thereto by respective flexible conductors 154a, 156a, 154b, 156b, 154c, 156c. At intersections of the flexible conductors 154a, 156a, 154b, 156b, 154c, 156c with the interconnection bus bar 152 are insulating standoffs 160 that are mounted at the rear face 174 of the control housing 170 and support the interconnection bus bar 152. As shown in FIG. 4, test ports 197 may be provided for probing line and load conductors associated with respective ones of the vacuum circuit interrupter pole units 142a, 144a, 142b, 144b, 142c, 144c. The test ports 197 may be concealed when the front panel 120 is in place.

Another vacuum circuit interrupter pole unit 180, which is used as a grounding switch, is positioned below the rows of vacuum circuit interrupter pole units 142a, 144a, 142b, 144b, 142c, 144c, and extends longitudinally in a direction orthogonal to the longitudinal axes of the vacuum circuit interrupter pole units 142a, 144a, 142b, 144b, 142c, 144c. One terminal of the grounding vacuum circuit interrupter pole unit 180 is coupled to the interconnection bus bar 152 by a vertically extending bus bar 158. Another terminal of the grounding vacuum circuit interrupter pole unit 180 is coupled to a ground contact 190. Although the figures illustrate connection of the vacuum circuit interrupter pole unit 180 to a ground contact 190 located near the base of the chassis 110, it will be appreciated that other arrangements may be used.

Figure 3:
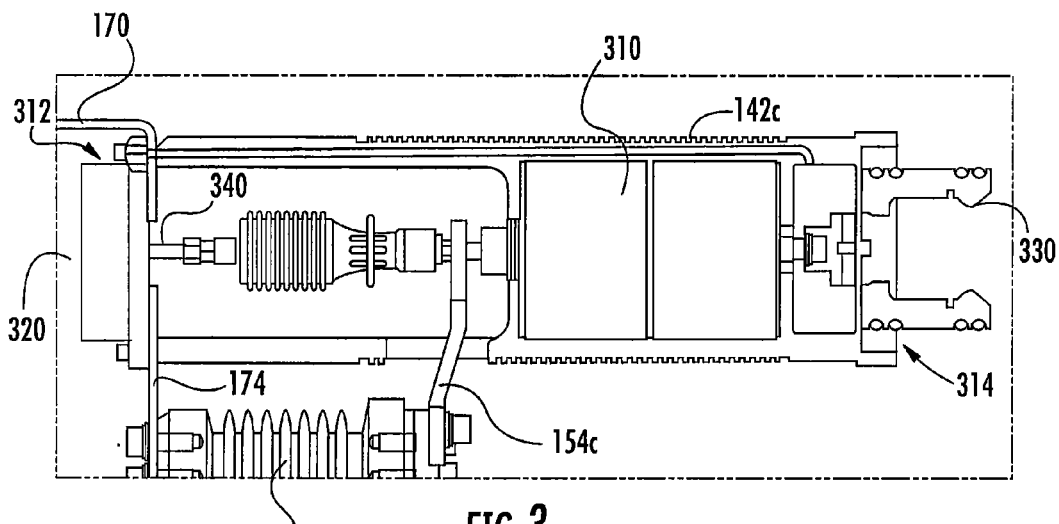
FIG. 3 is a detailed side view of a vacuum circuit interrupter pole unit of the grounding and test device of FIGS. 1 and 2.

FIG. 3 is a detailed view of a vacuum circuit interrupter pole unit 142a. The pole unit 142a includes a vacuum circuit interrupter 310. The vacuum circuit interrupter 310 is actuated by an electromagnetic actuator 320 at a first end 312 of the pole unit 142c via a drive rod 340. A first terminal of the vacuum circuit interrupter 310 is electrically coupled to a primary disconnect or stab 330 disposed at a second end 314 of the pole unit 142c. A second terminal of the vacuum circuit interrupter 310 is electrically coupled to a flexible connector 154c that is coupled to the interconnection bus 152 at an insulating standoff 160.

Figures 5, 6:
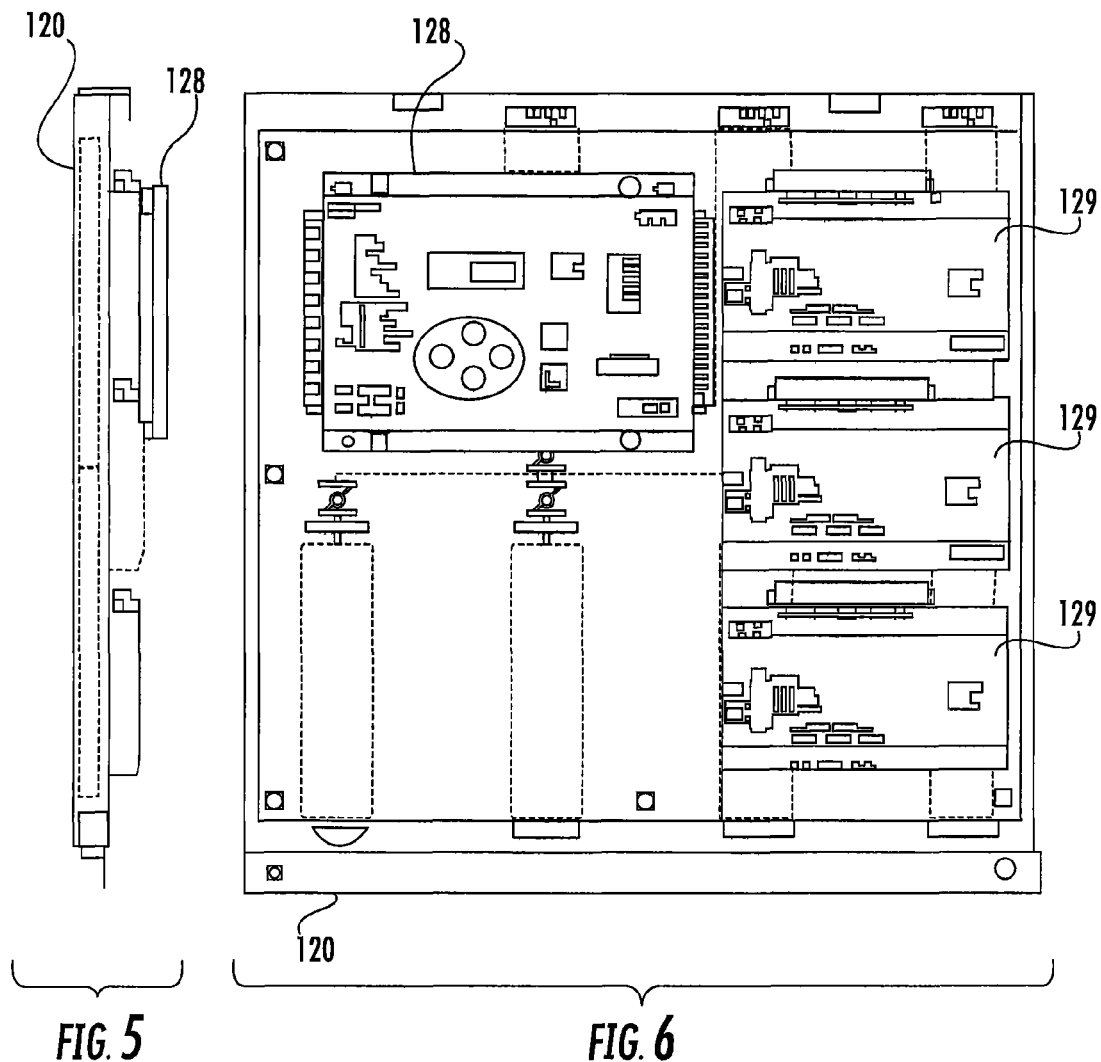
FIGS. 5 and 6 are side and rear elevations of the front cover of the grounding and test device of FIGS. 1 and 2.

Referring to FIGS. 5 and 6 with continuing reference to FIGS. 1 and 2, the front panel 120 of the grounding and test device 100 is supports a controller circuit assembly 120 and power supply assemblies 129 that provide power thereto. Switch units 122a, 122b, 122c, 124a, 124b, 124c, 126 including pairs of pushbutton switches 113, 114 and a switch position indicator 115 are disposed at a front face of the front panel 120. The controller circuit assembly 128 is configured to control the vacuum circuit interrupter pole units 142a, 144a, 142b, 144b, 142c, 144c, 180 responsive to user inputs provided via the switch units 122a, 122b, 122c, 124a, 124b, 124c, 126. In particular, the controller circuit assembly 128 electrically drives the magnetic actuators of respective ones of the vacuum circuit interrupter pole units 142a, 144a, 142b, 144b, 142c, 144c, 180 to open and close vacuum circuit interrupter contacts thereof responsive to user inputs provided using respective ones of the switch units 122a, 122b, 122c, 124a, 124b, 124c, 126. The controller circuit assembly 128 drives the magnetic actuators of the vacuum circuit interrupter pole units 142a, 144a, 142b, 144b, 142c, 144c, 180 using energy stored in capacitors 195 disposed below the vacuum circuit interrupter pole units 142a, 144a, 142b, 144b, 142c, 144c.

Figure 7:
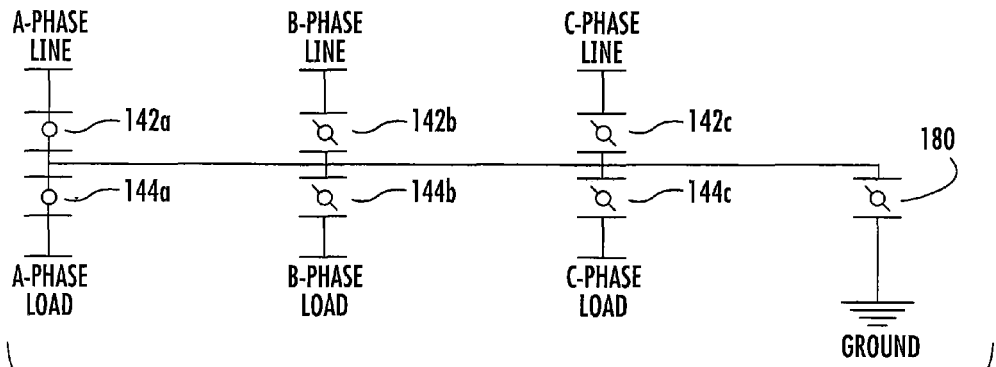
FIGS. 7-11 are schematic diagrams illustrating operations of the grounding and test device of FIGS. 1 and 2 according to further embodiments.
Figure 8:
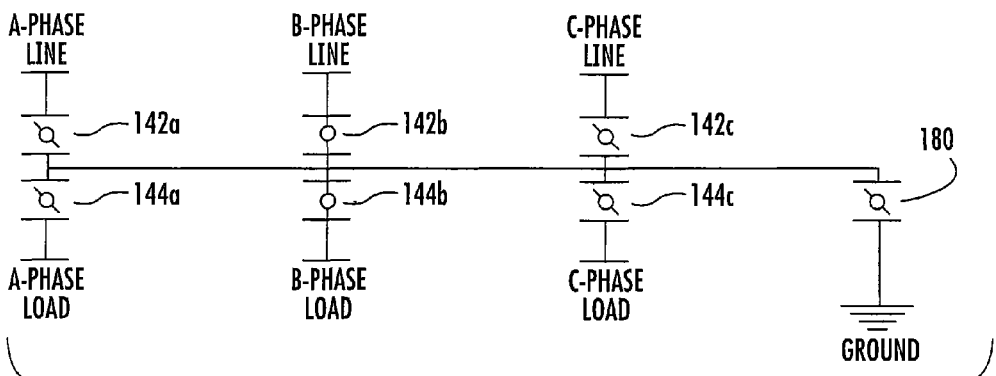
Figure 9:
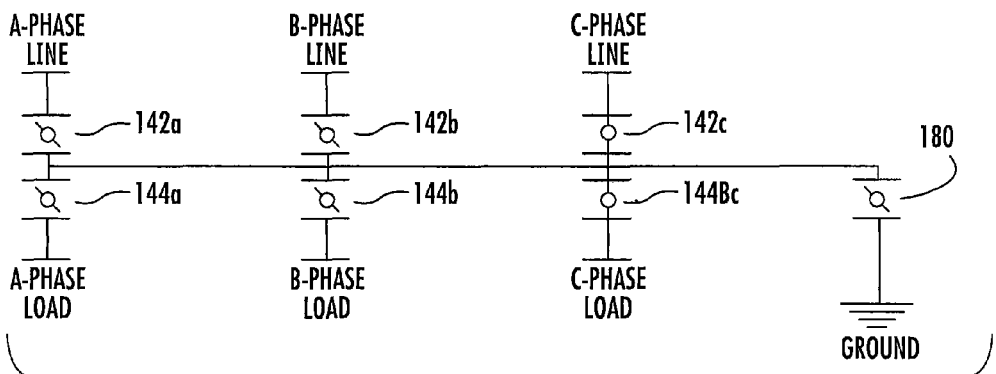
Figure 10:
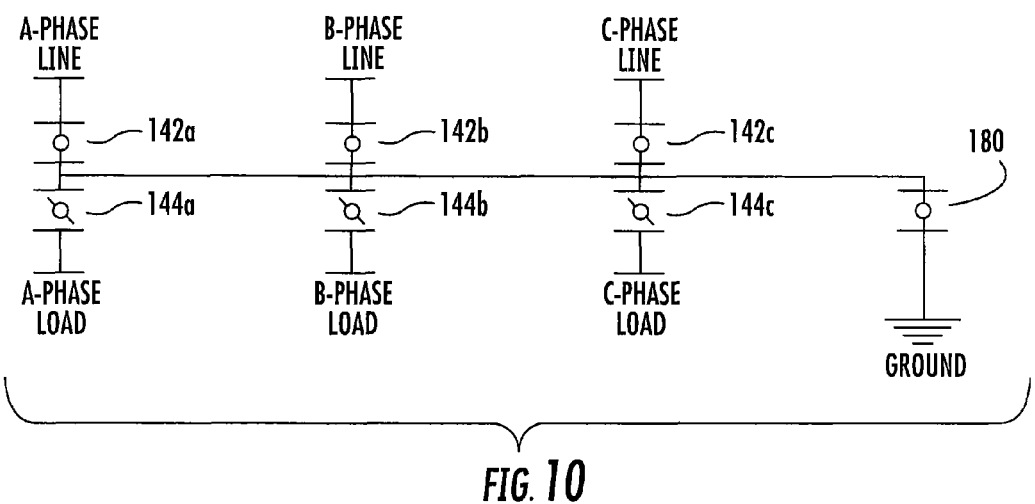
Figure 11:
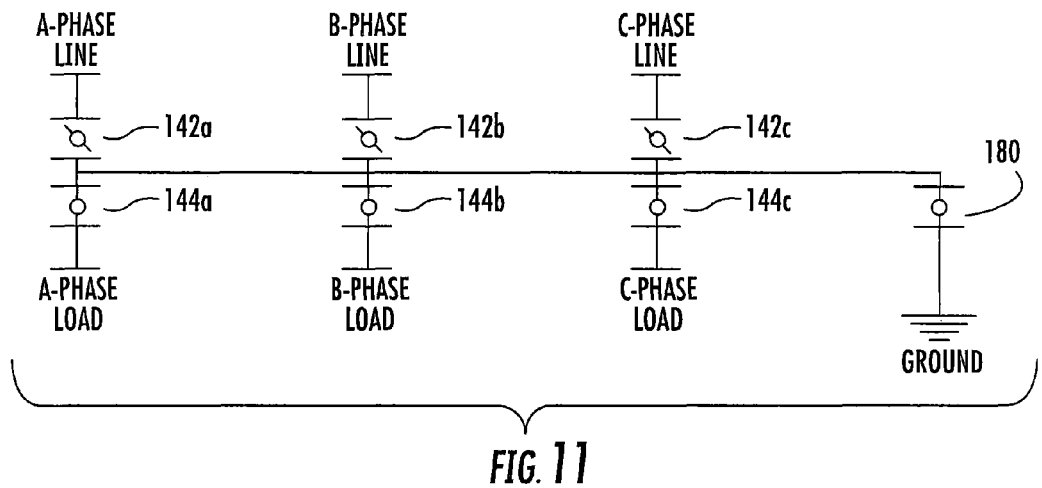

FIGS. 7-11 illustrate various test and grounding configurations that may be provided by the grounding and test apparatus 100. As shown in FIGS. 7-9, individual phase and load conductors may be connected while other phases and ground are disconnected to facilitate testing of individual phases. Referring to FIGS. 10 and 11, the vacuum circuit interrupter pole units 142a, 144a, 142b, 144b, 142c, 144c may be selectively opened and closed to facilitate grounding of line and load conductors via the grounding vacuum circuit interrupter pole unit 180.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A grounding and test device comprising:
    a chassis configured to be removably installed in a drawout switchgear compartment having a load conductor and a line conductor therein;
    an interconnection bus supported by the chassis;
    a ground conductor supported by the chassis;
    a first vacuum circuit interrupter supported by the chassis and configured to selectively couple and decouple the interconnection bus and the line conductor;
    a second vacuum circuit interrupter supported by the chassis and configured to selectively couple and decouple the interconnection bus and the load conductor; and
    a third vacuum circuit interrupter supported by the chassis and configured to selectively couple and decouple the interconnection bus and the ground conductor.

2. The grounding and test device of claim 1:
    wherein the first vacuum circuit interrupter comprises a plurality of first vacuum circuit interrupters, respective ones of which are configured to selectively couple and decouple the interconnection bus and respective ones of a plurality of line conductors; and
    wherein the second vacuum circuit interrupter comprises a plurality of second vacuum circuit interrupters, respective ones of which are configured to selectively couple and decouple the interconnection bus and respective ones of a plurality of load conductors.

3. The grounding and test device of claim 1:
    wherein the chassis comprises a housing having a vertical rear face configured to face into the switchgear compartment when the chassis is installed;
    wherein first vacuum circuit interrupter is included in a first elongate pole unit mounted on and extending from the vertical rear face of the housing; and
    wherein the second vacuum circuit interrupter is included in a second elongate pole unit mounted on and extending from the vertical rear face of the housing.

4. The grounding and test device of claim 3:
    wherein a first end of the first pole unit is mounted at the vertical rear face of the housing and wherein the first pole unit comprises a contact disposed at a second end of the first pole unit and configured to engage the line conductor when the chassis is installed in the breaker compartment; and
    wherein a first end of the second pole unit is mounted at the vertical rear face of the housing and wherein the second pole unit comprises a contact disposed at a second end of the second pole unit and configured to engage the load conductor when the chassis is installed in the breaker compartment.

5. The grounding and test device of claim 3, wherein the interconnection bus comprises an elongate bus bar extending horizontally between the first and second pole units and mounted on the vertical rear face of the housing.

6. The grounding and test device of claim 5, further comprising at least one insulating standoff mounted on the vertical rear face of the housing and supporting the bus bar.

7. The grounding and test device of claim 5, wherein the third vacuum circuit interrupter is included in a third elongate pole unit mounted on the chassis beneath the first and second pole units and the bus bar and extending longitudinally in a direction orthogonal to longitudinal axes of the first and second pole units.

8. The grounding and test device of claim 7, wherein the bus bar comprises a first bus bar and further comprising a second elongate bus bar connected to the first bus bar and extending perpendicularly therefrom to contact a terminal of the third pole unit.

9. The grounding and test device of claim 4, further comprising a controller supported by the chassis and configured to control the first and second pole units.

10. The grounding and test device of claim 9, further comprising:
a first control switch coupled to the controller and configured to control the first vacuum circuit interrupter pole unit; and
a second control switch coupled to the controller and configured to control the second vacuum circuit interrupter pole unit.

11. The grounding and test device of claim 10, wherein the controller and the first and second switches are mounted in a panel removably attached at the front face of the housing.

12. The grounding and test device of claim 1, wherein the drawout switchgear compartment comprises a breaker compartment.

13. A grounding and test device comprising:
a chassis configured to be removably installed in a drawout switchgear compartment having a plurality of load conductors and a plurality of line conductors therein, the chassis comprising a housing having a vertical front face configured to face outward from the circuit breaker housing when the chassis is installed therein and a vertical rear face on an opposite side of the housing from the first vertical face and configured to face inside the switchgear compartment;
a horizontal row of spaced apart first vacuum circuit interrupter pole units mounted on the vertical rear face of the housing and extending perpendicularly therefrom, the first vacuum circuit interrupter pole units having respective contacts configured to engage respective ones of the plurality of line conductors;
a horizontal row of spaced apart second vacuum circuit interrupter pole units mounted on the vertical rear face of the housing and extending perpendicularly therefrom parallel to the row of first vacuum circuit interrupter pole units, the second vacuum circuit interrupter pole units having respective contacts configured to engage respective ones of the plurality of load conductors;
an elongate interconnection bus bar mounted on the vertical rear face of the housing, extending horizontally between the rows of first and second vacuum circuit interrupter pole units;
respective flexible conductors extending perpendicularly from the interconnection bus bar and connecting respective ones of the first and second vacuum circuit interrupter pole units to the interconnection bus bar;
a ground conductor supported by the chassis; and
a third vacuum circuit interrupter pole unit supported by the chassis and coupled between the interconnection bus and the ground conductor.

14. The grounding and test device of claim 13, wherein the third vacuum circuit interrupter pole unit is positioned below the rows of first and second vacuum circuit interrupter pole units and longitudinally extends along a direction orthogonal to longitudinal axes of the first and second vacuum circuit interrupter pole units.

15. The grounding and test unit of claim 14, further comprising a ground connection bus extending perpendicularly from the interconnection bus to contact the third vacuum circuit interrupter pole unit and passing between adjacent vacuum circuit interrupter pole units of a lower row of the rows of first and second vacuum circuit interrupter pole units.

16. The grounding and test unit of claim 13, further comprising a controller configured to control the first, second and third vacuum circuit interrupter pole units.

17. The grounding and test unit of claim 16, further comprising respective switches coupled to the controller and configured to control respective ones of the first, second and third vacuum circuit interrupter pole units.

18. A method comprising:
installing a grounding and test device in a drawout switchgear compartment having a load conductor and a line conductor therein, the grounding and test device comprising a first vacuum circuit interrupter configured to coupled between an interconnection bus and the line conductor, a second vacuum circuit interrupter configured to be coupled between the interconnection bus and the load conductor, and a third vacuum circuit interrupter configured to be coupled between the interconnection bus and a ground conductor;
closing the first third vacuum circuit interrupter and the third vacuum circuit interrupter while maintaining the second vacuum circuit interrupter in an open state to ground the line conductor; and
closing the second vacuum circuit interrupter and the third vacuum circuit interrupter while maintaining the first vacuum circuit interrupter in an open state to ground the load conductor.

19. The method of claim 18, further comprising closing the first and second vacuum circuit interrupters while maintaining the third vacuum circuit interrupter in an open state.

20. The method of claim 18:
wherein the first vacuum circuit interrupter is one of a plurality of first vacuum circuit interrupters, respective ones of which are configured to be coupled between the interconnection bus and respective line conductors of the switchgear compartment;
wherein the second vacuum circuit interrupter is one of a plurality of second circuit vacuum interrupters, respective ones of which are configured to be coupled between the interconnection bus and respective load conductors of the switchgear compartment;
wherein closing the first third vacuum circuit interrupter and the third vacuum circuit interrupter while maintaining the second vacuum circuit interrupter in an open state to ground the line conductor comprises closing the plurality of first vacuum circuit interrupters and the third vacuum circuit interrupter while maintaining the plurality of second vacuum circuit interrupters in an open state to ground the plurality of line conductors; and
wherein closing the second vacuum circuit interrupter and the third vacuum circuit interrupter while maintaining the first vacuum circuit interrupter in an open state to ground the load conductor comprises closing the plurality of second vacuum circuit interrupters and the third vacuum circuit interrupter while maintaining the plurality of first vacuum circuit interrupters in an open state to ground the plurality of load conductors.

* * * * *